O. M. DAHL.
FISH HOOK.
APPLICATION FILED FEB. 28, 1917.
1,249,342.     Patented Dec. 11, 1917.
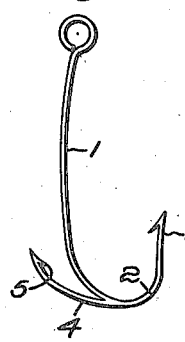
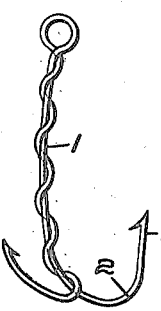
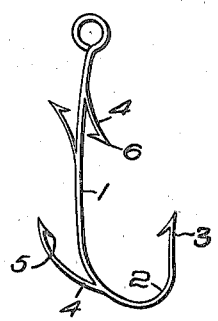
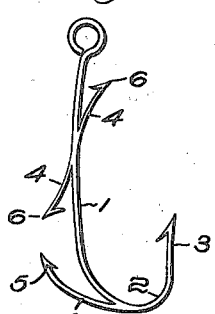
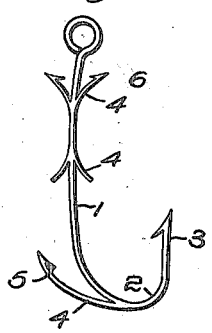
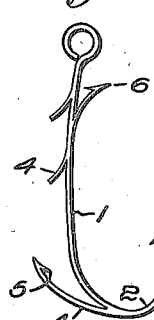
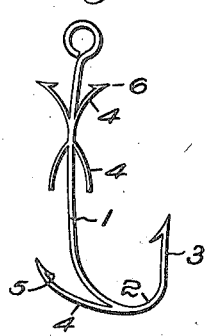
Inventor:
Ole M. Dahl,

UNITED STATES PATENT OFFICE.

OLE M. DAHL, OF BOSTON, MASSACHUSETTS.

FISH-HOOK.

1,249,342.       Specification of Letters Patent.     Patented Dec. 11, 1917.

Application filed February 28, 1917. Serial No. 151,581.

*To all whom it may concern:*

Be it known that I, OLE M. DAHL, a citizen of the United States, and resident of Roxbury district, Boston, in the county of Suffolk and Commonwealth of Massachusetts, have invented an Improvement in Fish-Hooks, of which the following description, in connection with the accompanying drawings, is a specification, like characters on the drawings representing like parts.

This invention relates to fish-hooks and aims to provide a novel and improved hook of that type having the advantages hereinafter set forth.

In the drawings of the embodiments of my invention illustrated and described herein:

Figure 1 is a side view of one satisfactory form;

Fig. 2 is a top view thereof; and

Figs. 3 to 9, inclusive, are side views of modified forms of construction.

All fishermen, both professional and amateur, have learned by experience how frequently a fish, "not well hooked," frees himself from the hook, sometimes carrying the bait with him. My novel hook is adapted to prevent both of these results.

Referring first to Figs. 1, 2, my novel fish-hook is shown as comprising a hook having the usual shank 1, curved or hook portion 2, and barb 3 thereon.

In addition to the foregoing, I provide the hook, at a suitable point, preferably on the hook portion 2, with an additional spur 4, carrying another barb 5.

Furthermore the two barbs 3, 5, see Fig. 2, are preferably bent laterally and in opposite directions relative to the vertical plane of the shank 1 and hook portion 2.

It is obvious that if a fish is hooked simply by means of the usual barb 3, as for instance in the upper jaw, or side of either jaw, he can free himself more readily from the hook than he could if he were hooked by two barbs such as 3, 5, Fig. 1, in opposite jaws or opposite sides of one jaw. So long as one jaw or one side of either jaw is free, the fish is capable of great freedom of action which may result in freeing himself.

If, however, when he closes his jaws on the bait, he also closes them on two barbs extended in different directions, it will be obvious that the freedom of action of the jaws will be much curtailed and consequently the chances of freeing himself will be greatly diminished.

Therefore, and for the above reason, among others, I have conceived the novel idea of providing the hook with two oppositely directed points, one on the usual hook end and having a barb downwardly extended, and the other at the end of an upwardly and rearwardly extended spur on the back or outside of the hook portion, with the barb pointed downwardly and forwardly or toward the curved or hook portion.

Furthermore I have found that if the two barbs, see Fig. 2, are bent laterally relatively to the vertical plane of the shank and hook portions as already described, the fish cannot free himself so readily, as it requires simultaneous movement of the two jaws in different directions to free the jaws from the barbs by the same cuts that the barbs made when they entered the jaw and this movement is difficult to effect and its necessity not appreciated by the fish.

I am aware that it has been proposed to provide a fish-hook with additional barbs within the curved or hook portion; and also a barb outside the hook portion but pointed downwardly and against the hook portion. But these constructions are of no value. They do not engage the jaws and pull in opposite directions against movement thereof.

I am aware also that it has been suggested to provide the shank or hook with a spur to prevent the bait from sliding upward on the shank. But this, of course, does not perform the functions of a second barb as described. However, for the purpose of securing the bait in position, I have provided the shank 1, in Figs. 3 to 8 inclusive, with novel bait-holding spurs 4, also provided with barbs 5. These barbs lock the bait in position on the hook so that, if torn from the barb 3, or if it becomes for any reason detached from the barb 3, they hold it securely. Spurs without barbs do not effect this result.

It is, doubtless, possible to vary the foregoing constructions in minor details, all within the spirit of my invention and the scope of the appended claims, as for instance, the construction shown in Fig. 9, where the wire after being fashioned into a loop at the upper end of the shank is wound about the shank downwardly and then extended rearwardly therefrom, forming a spur with a barb thereon. This downwardly wound wire terminating in the rearwardly and downwardly extended shank, also acts effectively to prevent the bait from sliding up on the shank as it is apt to do when the shank is perfectly smooth and free from spurs or other bait-holding means.

I have found that the spiral wire wound about the shank acts as effectively for holding the bait as does a spur on the shank.

Claims:

1. A fish-hook having a shank, a hook, a barb thereon, and a spur rearwardly and upwardly extended from the outside of the hook, with a downwardly and forwardly pointed barb thereon.

2. A fish-hook having a shank, a hook, a barb thereon, a spur rearwardly and upwardly extended from the outside of the hook, and a bait locking barb on the shank.

3. A fish-hook having a single shank, a single hook section thereon, a barb extended substantially upright therefrom, a barb extended rearwardly from the outside of said section relative to the first barb and on the opposite side of the shank, the two barbs bent laterally in opposite directions from the plane of the hook section.

In testimony whereof, I have signed my name to this specification.

OLE M. DAHL.